United States Patent Office 3,318,894
Patented May 9, 1967

3,318,894
BENZO[a]QUINOLIZINE INTERMEDIATE FOR THE PREPARATION OF 2-DEHYDRO-EMETINES
Arnold Brossi, Verona, N.J., assignor to Hoffmann-La Roche Inc., Nutley, N.J., a corporation of New Jersey
No Drawing. Original application Mar. 19, 1963, Ser. No. 266,183. Divided and this application Sept. 27, 1963, Ser. No. 311,984
Claims priority, application Switzerland, Mar. 21, 1962, 3,386/62
7 Claims. (Cl. 260—286)

This application is a division of application Ser. No. 266,183, filed Mar. 19, 1963.

The present invention relates to pharmaceutically useful novel compounds and methods for their preparation. More specifically, the present invention relates to (—)-2-dehydro-emetine and its 3-lower alkyl homologs. The present invention also relates to a method of preparing these specific optically active compounds, which method comprises using an optically active compound, i.e. a (—)-benzo[a]quinolizine, as a starting material, and which method preserves the optical specificity, thus providing a facile route to the desired optically active end products.

2-dehydro-emetine, which is an outstanding chemotherapeutic for the treatment of amebiasis and bilharziasis, possesses two asymmetric carbon atoms and is obtained according to known methods in the form of a racemate. It has now been found that from the racemic form, which, for example, consists of equal parts of compounds of Formulas Ia and IIa shown below, only the (—)-2-dehydro-emetine Ia exhibits the desired chemotherapeutic characteristics, whereas the (+)-2-dehydro-emetine IIa is inactive.

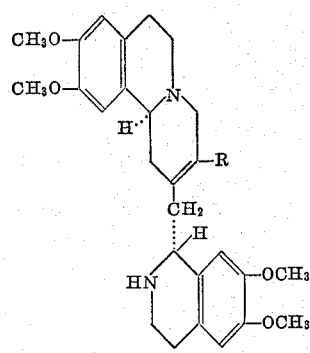

(—)-Series
Ia : R=C₂H₅
Ib : R=CH₃, C₃H₇, C₄H₉, etc.

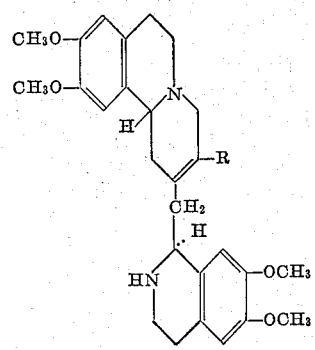

(+)-Series
IIa : R=C₂H₅
IIb : R=CH₃, C₃H₇, C₄H₉, etc.

In the above formulas R represents lower alkyl. As used herein, lower alkyl refers to both straight and branched chain hydrocarbon groups such as methyl, ethyl, propyl, isopropyl, butyl, isobutyl and the like. More specifically, when R is ethyl, the compounds represent 2-dehydro-emetine and are referred to as Ia and IIa, respectively. Wherein R represents a lower alkyl moiety other than ethyl, the compounds will be referred to as Ib and IIb, respectively.

In view of the above finding of chemotherapeutic activity being critically dependent on the optical configuration, a stereospecific synthesis of the active isomer is of great interest. Such a method for the synthesis of (—)-2-dehydro-emetine Ia, and its 3-lower alkyl homologs Ib, is the subject of this invention.

A known method for the preperation of rac. 2-dehydro-emetine consists of condensing homoveratrylamine with rac. 2 - carbalkoxymethyl-3-ethyl-9,10-dimethoxy-1,4,6,7-tetrahydro-11bH-benzo[a]quinolizine, or the product obtained via the hydrolysis thereof, i.e. 2-carboxymethyl-3-ethyl - 9,10-dimethoxy-1,4,6,7-tetrahydro-11bH-benzo[a] quinolizine, cyclizing the so-formed acid amide and hydrogenating the thus obtained 2-dehydro-O-methyl-psychotrine. Proceeding from substituted benzo[a]qinolizines containing, instead of the ethyl group in the 3-position, for example, a methyl, propyl, isopropyl, butyl, or isobutyl group, there are obtained 3-lower alkyl homologs of 2-dehydro-emetine.

One embodiment of the present invention is a method for the preparation of (—)-2-dehydro-emetine Ia and its 3-alkyl homologs Ib which comprises beginning with (—)-2-carb-lower alkoxy-methyl-3-lower alkyl-9,10 - dimethoxy - 1,4,6,7 - tetrahydro-11bH-benzo[a]quinolizin~ (Formula III) as a starting material.

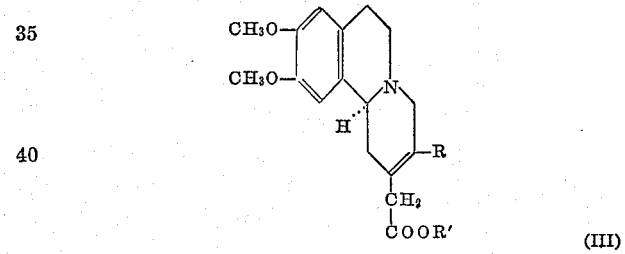

(—)-Series
IIIa : R=R'=lower alkyl
IIIb : R=lower alkyl, R'=H
IIIc : R=C₂H₅, R'=CH₃

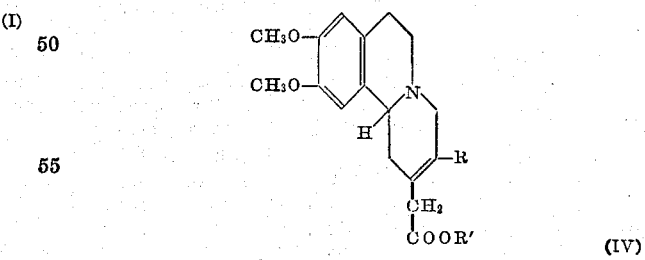

(+)-Series
IVa : R=R'=lower alkyl
IVb : R=lower alkyl, R'=H
IVc : R=C₂H₅, R'=CH₃

(—)-2-carb-lower alkoxymethyl-3-lower alkyl-9,10-dimethoxy-1,4,6,7-tetrahydro-11bH-benzo[a]quinolizine IIa can be advantageously prepared by separation of rac. 2-carb-lower alkoxymethyl-3-lower alkyl-9,10-dimethoxy-1, 4,6,7-tetrahydro-11bH-benzo[a]quinolizine into its optical antipodes IIIa and IVa. This separation can be effected, for example, via fractional crystallization of the salts formed between the racemate and a suitable optically active acid such as dibenzoyl-D-tartaric acid, L-tartaric acid, etc. A preferred method for the preparation of IIIc from the racemate consists of adding dibenzoyl-D-tartaric acid to said racemate and then separating the dibenzoyl-D-tartrate of IVc. From the filtrate, IIIc is then obtained via concentration, followed by decomposition with alkali. Said IIIc can then be purified via the L-tartrate.

The (—)-rotatory enantiomeric base IIIa in the next phase of the described reaction sequence undergoes acid amide formation, cyclization and hydrogenation. The (+)-rotatory enantiomeric base IVa can again be reconverted into the racemic form and this can, once again, be separated into its optical antipodes. By this procedure, the total yield of the desired end product is elevated. One such method for reconverting the non-desired (+)-antipode into the racemate is an object of the instant invention. The conversion into the racemate can, for example, be effected by oxidizing IVa with mercuric, cupric or ferric salt, advantageously with mercuric acetate in acetic acid solution, to a 2-carb-lower alkoxymethyl-3-lower alkyl-9,10-dimethoxy-dihydro-11bH-benzo[a]quinolizine which subsequently can be reduced.

The compounds formed by oxidation can be represented by Formula V below, when present in the form of the respective bases, whereas, when present as quaternary salts, they are represented by Formula VI:

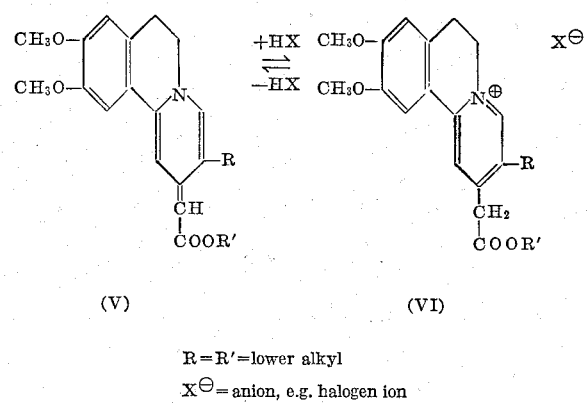

R=R'=lower alkyl

X⊖=anion, e.g. halogen ion

As becomes evident from the above Formulae V and VI, tautomerism is involved.

The subsequent reduction can be effected by suitable reduction systems, for example, potassium borohydride or sodium borohydride in a lower alkanol such as methanol. The reduction can also be effected by catalytic hydrogenation, for example, in the presence of platinum oxide.

Preliminary to the formation of the homoveratrylamide, the carb-lower alkoxymethyl compound IIIa is advantageously saponified to the carboxymethyl compound IIIb, which saponification can be effected via acid hydrolysis, for example, via boiling with dilute mineral acid such as dilute hydrochloric acid. The acid amide formation (i.e., the formation of the homoveratrylamide) and the cyclization to (—)-2-dehydro-O-methyl-psychotrine or its 3-alkyl homologs can be effected according to methods known per se. The homoveratrylamide is formed, for example, by the heating of IIIb with homoveratrylamine in an inert organic water immiscible solvent, preferably an aromatic hydrocarbon, such as benzene, toluene or xylene, in the course of which the aqueous azeotrope formed is removed. The cyclization is suitably effected by the introduction into the reaction mixture of a phosphorus cyclization agent such as phosphorus oxychloride, phosphorus pentoxide or the like, in an inert solvent, such as benzene, and at an elevated temperature, for example, at the boiling point of the reaction mixture.

The subsequent hydrogenation (i.e. reduction) of the cyclized product proceeds via formation of a new asymmetric center at the carbon atom 1' of the isoquinoline ring to a stereoisomeric mixture consisting of I and VII.

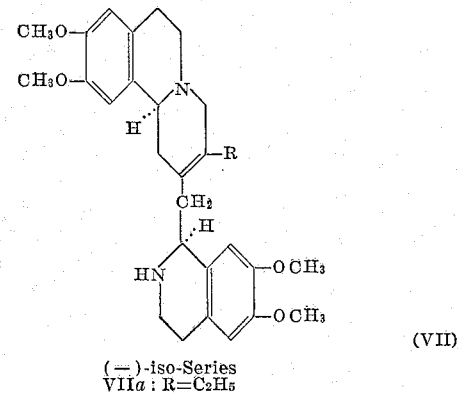

(—)-iso-Series
VIIa : R=C₂H₅

The hydrogenation can be effected, for example, catalytically or by means of an alkali metal-metal hydride such as lithium borohydride, lithium aluminium hydride, sodium borohydride or the like. In the case of the reduction of (—)-2-dehydro-O-methyl-psychotrine there is obtained, besides the desired (—)-2-dehydro-emetine Ia also (—)-2-dehydro-isoemetine VIIa.

The compounds of the (—)-2-dehydro-isoemetine series can be separated, for example, via fractional crystallization, from the compounds of the (—)-2-dehydro-emetine series. The separation can be effected, for example, via fractional crystallization of the mineral acid salts, such as the hydrohalide salts, for example, the dihydrochloride, dihydrobromide, etc.

In a further reaction step, the non-desired compounds of the (—)-2-dehydro-isometine-series, for example VIIa, can be reconverted into the desired isomer. This can be effected by first dehydrogenating to eliminate the asymmetric center found in the 1'-position, thus forming a compound of the (—)-2-dehydro-O-methyl-psychotrine series, and by subsequently hydrogenating to form a stereoisomeric mixture I and VII. The dehydrogenation can be effected, for example, via N-halogenation of the nitrogen atom of the isoquinoline ring, followed by subsequent treatment with an alkaline agent.

The (—)-2-dehydro-emetine and its 3-alkyl homologs of Formula I obtained according to the processes of this invention, are new compounds with valuable chemotherapeutic properties, for example amebicidal properties; and therefore useful as chemotherapeutics in the treatment of amebiasis. Said compounds of Formula I are basic in nature and form acid addition salts of both organic and inorganic acids. Thus they form pharmaceutically acceptable acid addition salts with medicinally acceptable acids such as hydrohalic acids, for example hydrochloric acid, hydrobromic acid, nitric acid, sulfuric acid, phosphoric acid, p-toluene sulfonic acid, and the like. They can be used, for example, in the form of conventional pharmaceutical preparations in which either a base of Formula I or a pharmaceutically acceptable acid addition salt thereof can be incorporated; for example, said active agent can be employed in combination with pharmaceutical organic or inorganic inert carrier materials suitable for enteral or parenteral application, for example water, gelatin, starch, magnesium stearate, talc, vegetable oils, gums, polyalkylene glycols, Vaseline and the like. The pharmaceutical preparations can be in conventional solid forms such as tablets, dragées, suppositories, capsules, etc.; or in conventional liquid forms such as solutions, suspensions or emulsions. They can be subjected to conventional pharmaceutical procedures, for example, sterilization, and can contain conventional pharmaceutical excipients or adjuvants, for example preservatives, wetting agents, emulsifying agents, salts for the adjustment of osmotic pressure, or buffers. They can also contain other chemotherapeutic agents.

The following examples are illustrative, but not limitative, of the invention. All temperatures are stated in degrees centigrade.

Example 1

82 g. of 2-carbomethoxymethyl-3-ethyl-9,10-dimethoxy-1,4,6,7-tetrahydro - 11bH - benzo[a]quinolizine was dissolved in 100 ml. of methanol. To this solution there was then gradually added with stirring, a solution of 90 g. of dibenzoyl-D-tartrate acid in 100 ml. of methanol. Ether was then added to the reaction mixture until turbidity, the mixture then permitted to stand for 2 hours in the cold, and the filtrate then separated from the precipitated crystals. (The filtrate, as described in the next paragraph, was worked up to the (−)-base.) Upon crystallization of the precipitate from 300 ml. of methanol there was obtained 63 g. of dibenzoyl-D-tartrate which melted at 137–148°; $[\alpha]_D^{22} = +49°$ (c.=1 in methanol). In order to obtain the free base, 58 g. of this dibenzoyl-D-tartrate was partitioned between ether and dilute aqueous sodium hydroxide; after which the ether solution was separated, dried and concentrated. The residue consister of 30 g. of (+)-2-carbomethoxymethyl-3-ethyl-9,10 - dimethoxy-1,4,6,7-tetrahydro-11bH-benzo[a]quinolizine in the form of an oil. A fraction distilled off in a high vacuum of 0.05 mm. Hg and at a bath temperature of 230° exhibited an optical rotation of $[\alpha]_D^{22} = +249°$ (c.=2.2 in methanol).

In order to isolate the (−)-antipode, the above mentioned filtrate was concentrated to dryness and the residue partitioned between dilute aqueous sodium hydroxide and ether, and the ether solution separated and concentrated. The so-obtained residue was dissolved in 250 ml. of acetone, and 23 g. of finely pulverized tartaric acid added thereto. The mixture was then warmed until complete solution was effected. The solution was then permitted to stand overnight, whereupon an L-tartrate salt crystallized out and was filtered off, then recrystallized from methanol/ether yielding 50 g. of an L-tartrate, melting at 103–105°, $[\alpha]_D^{22} = -150°$ (c.=1 in methanol). In order to isolate the (−)-base, 45 g. of this L-tartrate was partitioned between sodium hydroxide and ether. The ether solution was then dried and concentrated, yielding 30 g. of (−)-2-carbomethoxymethyl-3-ethyl-9,10-dimethoxy-1,4,6,7-tetrahydro-11bH-benzo[a]quinolizine in the form of an oil. A sample obtained by distillation in a high vacuum at 0.01 mm. Hg and at a bath temperature of 230° exhibited an optical rotation of $[\alpha]_D^{22} = -255°$ (c.=2 in methanol).

30 g. of (−)-2-carbomethoxymethyl-3-ethyl-9,10-dimethoxy-1,4,6,7-tetrahydro - 11bH - benzo[a]quinolizine was dissolved in 500 ml. of 3 N hydrochloric acid and the resulting mixture boiled for one hour at reflux, then concentrated in a water jet vacuum and the residue dissolved in sodium hydroxide. The ether soluble part was then removed via extraction with ether and the sodium hydroxide phase adjusted to pH 6.5 by addition of acetic acid. Solid sodium chloride was then added thereto until saturation, and the mixture then extracted with chloroform. The combined chloroform phases were concentrated and the residue dissolved in ethyl acetate. The ethyl acetate solution was partially concentrated and then permitted to stand until crystallization occurred. There was obtained by this method, 23 g. of (−)-2-carboxymethyl-3-ethyl-9,10 - dimethoxy - 1,4,6,7 - tetrahydro-11bH-benzol[a]quinolizine melting at 141–143°; $[\alpha]_D^{22} = -244°$ (c.=1 in methanol).

22 g. of the latter substance was then suspended in 200 ml. of xylene, 22 g. of homovertrylamide added thereto and the reaction mixture heated at reflux for 16 hours, during which the water formed was withdrawn from the reaction mixture via azeotropic distillation. The reaction mixture was then concentrated in vacuo and the residue treated with ether until crystallization occurred. The so-formed mixture was then filtered off and crystallized from ethyl acetate yielding 26 g. of the (−)-homoveratrylamide of 2-carboxymethyl - 3 - ethyl-9,10-dimethoxy-1,4,6,7 - tetrahydro - 11bH - benzo[a]quinolizine melting at 155–157°; $[\alpha]_D^{22} = -189°$ (c.=1 in methanol). 25 g. of the so-obtained (−)-homoveratrylamide was dissolved in 260 ml. of benzene and 12 ml. of phosphorus oxychloride added to this solution. The mixture was then warmed for 1 hour at 80° and subsequently concentrated in vacuo, the residue dissolved in water, the aqueous phase rendered alkaline via addition of dilute sodium hydroxide and the free base then extracted with ethyl acetate. The ethyl acetate solution was then dried and concentrated and the residue dissolved in acetone. Methanolic hydrochloric acid was then added thereto, and the resulting mixture diluted with ether until turbidity sets in. After being permitted to stand, the resulting crystals were filtered off and recrystallized from methanol/ether (90:10), yielding 12 g. of (−)-2-dehydro-O-methyl-psychotrine - dihydrochloride in the form of a hydrate with 3½ moles of water of crystallization, which hydrate was in the form of a reddish brown product which melted at 178–180°; $[\alpha]_D^{22} = -100°$ (c.=1 in water). U.V.-absorption maxima at 235, 289, 305 and 359 mμ, ε=17,700, 8,500 8,900 and 8,200 (in ethanol).

9 g. of the free base obtained from the above dihydrochloride via treatment with ammonia solution and the customary work up, was dissolved in 100 ml. of methanol and treated portionwise with 2 g. of sodium borohydride. After standing for 12 hours it was dried, the residue partitioned between water and ether, and the ether solution separated and concentrated. The basic mixture was then taken up in aqueous hydrobromic acid and permitted to stand, whereupon there crystallized 4 g. of (−)-2-dehydroisometine as a dihydrobromide hydrate which melted, upon recrystallization from methanol, at 258–260°;

$$[\alpha]_D^{22} = -107°$$

(c.=1 in methanol). U.V.-absorption maxima in ethanol at λ=282 mμ, ε=7,300. In order to effect isolation of (−)-2-dehydro-emetine, the hydrobromic acid filtrate was first concentrated to dryness, the residue then dissolved in methanol and the so-obtained solution then treated with ether until turbidity. After being permitted to stand, the solution was filtered, yielding 2 g. of (−)-2-dehydro-emetine - dihydrobromide - hemihydrate, which upon recrystallization from methanol/ether melted at 243–245°; $[\alpha]_D^{22} = -94°$ (c.=1 in methanol). U.V.-absorption maxima in ethanol at λ=282 mμ, ε=7,300. The (−)-2-dehydro-emetine was obtained as a free base upon decomposition of the hemihydrate with dilute alkali, and melted, after recrystallization from isopropyl ether/ether, at 93–95°, $[\alpha]_D^{22} = -183°$ (c.=1 in methanol).

The same diastereoisomeric mixture was also obtained via catalytic hydrogenation of (−)-2-dehydro-O-methyl-psychotrine, and it was separated by the same procedure as described above.

Example 2

10 g. of (+)-2-carbomethoxymethyl-3-ethyl-9,10-dimethoxy-1,4,6,7-tetrahydro - 11bH - benzo[a]quinolizine (obtained according to the procedure described in the above example) was dissolved in 500 ml. of 10% aqueous acetic acid, 39.6 g. of mercuric acetate was then added to this solution and the reaction mixture heated for 20 hours at 40°, then filtered free of the mercurous acetate formed, and the filtrate warmed at about 40° and hydrogen sulfide added over the course of 10 minutes. After the reaction mixture was cooled, mercurous sulfide was filtered off, and the filtrate concentrated to about 120 ml. in a water jet vacuum at 40°.

The concentrate was made alkaline by adding aqueous sodium hydroxide, whereafter it was extracted with 200 ml. of chloroform. The chloroform extract was concentrated under reduced pressure, whereby 3.1 g. of a residue were obtained, which upon recrystallization, gave 1.72 g. of 2-carbo-methoxymethylidene-3-ethyl-9,10-dimethoxy-6,7-dihydro-2H-benzo[a]quinolizine melting at 213–214°; U.V.-maxima in n/100 alcoholic sodium hydroxide solution: 243, 293, 318, 389, mμ (ε=22.400, 11.470, 16.900, 27.000). In the I.R.-spectrum the C=O band was found at 6.02μ.

By reaction with ethanolic hydrogen chloride and addition of ether, 2-carbomethoxymethyl-3-ethyl-9,10-dimethoxy-6,7-dihydro-benzo[a] quinolizinium chloride was obtained; melting point: 204° (with decomposition): U.V.-maxima in rectified alcohol: 232 (shoulder), 269 (shoulder), 286 and 365 mμ (ε=11.900, 9.400, 13.700 and 12.300); C=O band in I.R. spectrum at 5.79μ.

1 g. of 2-carbomethoxymethyliden-3-ethyl-9,10-dimethoxy-6,7-dihydro-2H-benzo[a]quinolizine was suspended in 10 ml. of methanol, whereupon 0.5 g. of sodium borohydride was added to the suspension in portions under slight cooling, so as to prevent the temperature from rising above 25°. After 3 hours, the reaction mixture was concentrated under reduced pressure to about ⅓ of the original volume, the concentrate diluted with water and extracted with chloroform. The residue left upon concentration of the chloroform extract was converted into the hydrochloride by means of methanolic hydrogen chloride. Crystallization induced by the addition of acetone and ether, gave 0.65 g. of rac. 2-carbomethoxymethyl-3-ethyl-1,4,6,7-tetrahydro-9,10-dimethoxy - 11bH-benzo[a]quinolizine hydrochloride. The latter can again be split into the optical antipodes as described in Example 1.

Example 3

2.0 g. of (+)-2-carbomethoxymethyl-3-ethyl-1,4,6,7-tetrahydro-9,10-dimethoxy - 11bH - benzo[a]quinolizine were dissolved in 300 ml. of methanol. By adding 32.5 g. of mercuric acetate there was formed a suspension which was heated under reflux and with stirring through 20 hours. The suspension was filtered, hydrogen sulfide was introduced into the filtrate and the mercurous sulfide formed was removed by filtration.

The residue obtained by concentration of the filtrate was converted to the hydrochloride by means of methanolic hydrogen chloride, whereupon crystallization was induced by adding ether. There were thus obtained 4.05 g. of 2-carbomethoxymethyl-3-ethyl-6,7-dihydro-9,10-dimethoxy-benzo[a]quinolizinium chloride melting at 204° (with decomposition). An additional quantity of 0.5 g. of this substance was obtained from the mother liquors.

By reduction thereof according to Example 2, rac. 2-carbomethoxymethyl-3-ethyl-1,4,6,7-tetrahydro - 9,10 - dimethoxy-11bH-benzo[a]quinolizine was obtained, which was again split up into the optical antipodes as described in Example 1.

I claim:
1. Optically active 2-carb-lower alkoxymethyl-3-lower alkyl-9,10-dimethoxy-1,4,6,7-tetrahydro - 11bH - benzo[a]quinolizine.
2. (−)-2-carbomethoxymethyl-3-ethyl - 9,10 - dimethoxy-1,4,6,7-tetrahydro-11bH-benzo[a]quinolizine.
3. (+)-2-carbomethoxymethyl-3-ethyl - 9,10 - dimethoxy-1,4,6,7-tetrahydro-11bH-benzo[a]quinolizine.
4. A compound of the formula

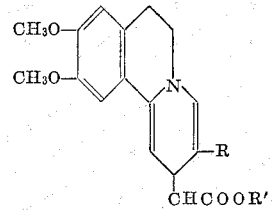

wherein R and R' are lower alkyl groups.
5. 2-carbomethoxymethylidene-3-ethyl - 9,10 - dimethoxy-6,7-dihydro-2H-benzo[a]quinolizine.
6. A compound containing a cation of the formula

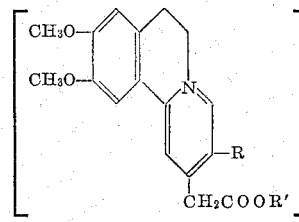

wherein R and R' are lower alkyl groups.
7. 2-carbomethoxymethyl-3-ethyl-9,10-dimethoxy - 6,7-dihydro-benzo[a]quinolizinium halide.

References Cited by the Examiner

Gaylord: "Reduction with Complex Metal Hydrides," Interscience, 1956, pp. 784 to 787.

ALEX MAZEL, *Primary Examiner.*
DONALD G. DAUS, *Assistant Examiner.*

UNITED STATES PATENT OFFICE

CERTIFICATE OF CORRECTION

Patent No. 3,318,894                  May 9, 1967

Arnold Brossi

It is hereby certified that error appears in the above numbered patent requiring correction and that the said Letters Patent should read as corrected below.

Column 2, line 66, for "II a" read -- III A --; column 5, lines 22 and 23, for "consister" read -- consisted --.

Signed and sealed this 1st day of October 1968.

(SEAL)

Attest:

Edward M. Fletcher, Jr.

Attesting Officer

EDWARD J. BRENNER

Commissioner of Patents